United States Patent
Kori et al.

(10) Patent No.: US 7,952,249 B2
(45) Date of Patent: May 31, 2011

(54) PERMANENT-MAGNET TYPE ELECTRIC ROTATING MACHINE AND PERMANENT-MAGNET TYPE ELECTRIC ROTATING MACHINE SYSTEM FOR AUTOMOBILE OR TRAIN

(75) Inventors: Daisuke Kori, Hitachinaka (JP);
Mamoru Kimura, Hitachi (JP);
Hiroyuki Mikami, Hitachinaka (JP);
Seikichi Masuda, Hitachi (JP);
Masayasu Fujieda, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/488,923

(22) Filed: Jun. 22, 2009

(65) Prior Publication Data

US 2009/0322175 A1    Dec. 31, 2009

(30) Foreign Application Priority Data

Jun. 27, 2008    (JP) .................................. 2008-168045

(51) Int. Cl.
*H02K 1/27*    (2006.01)
(52) U.S. Cl. ............................... 310/156.45; 310/156.53
(58) Field of Classification Search ............. 310/156.38, 310/156.39, 156.41, 156.42, 156.43, 156.45, 310/156.46, 156.53, 156.56
See application file for complete search history.

(56) References Cited

U.S. PATENT DOCUMENTS

| | | | | |
|---|---|---|---|---|
| 6,741,002 B2 * | 5/2004 | Nishiyama et al. | ...... | 310/156.53 |
| 6,979,924 B2 * | 12/2005 | Nishiyama et al. | ...... | 310/156.53 |
| 7,112,908 B2 * | 9/2006 | Takita et al. | ................... | 310/211 |
| 7,436,095 B2 * | 10/2008 | Aydin et al. | .............. | 310/156.53 |
| 2007/0096579 A1 * | 5/2007 | Aydin et al. | .............. | 310/156.56 |
| 2009/0015090 A1 * | 1/2009 | Kimura et al. | ............ | 310/156.08 |

FOREIGN PATENT DOCUMENTS

JP    9-90517 A    4/1997

* cited by examiner

*Primary Examiner* — Dang D Le
(74) *Attorney, Agent, or Firm* — Mattingly & Malur, P.C.

(57) ABSTRACT

A rotor is deployed such that the rotor becomes coaxially rotatable with a stator. A shaft is fixed onto the axis of a rotor iron-core. 1-pole constituting magnet slots are deployed into V-character pattern along an outer circumference portion of the rotor iron-core. Permanent magnets are embedded into the magnet slots. For the 1 pole, the 2 pieces of same-polarity permanent magnets are embedded into the V-character pattern. The configuration of each embedded permanent magnet is designed as follows: From the thickness of the permanent-magnet edge portion on the inner-diameter side of the rotor iron-core, which becomes the center of the V-character pattern, the thickness of the permanent magnet gradually increases toward the outer-diameter side of the rotor iron-core, which become the right and left edge portions of the V-character pattern. Simultaneously, curved lines are provided on both edge portions of the permanent magnet.

12 Claims, 6 Drawing Sheets

$0 < Ra1 \leq T1, 0 < Rb1 \leq T1$
$0 < Ra2 \leq T2, 0 < Rb2 \leq T2$ $0 < R1 \leq T1, 0 < R2 \leq T2$

PERMANENT-MAGNET TYPE ELECTRIC ROTATING MACHINE AND PERMANENT-MAGNET TYPE ELECTRIC ROTATING MACHINE SYSTEM FOR AUTOMOBILE OR TRAIN

BACKGROUND OF THE INVENTION

The present invention relates to a permanent-magnet type electric rotating machine, and an automobile-or-train-targeted permanent-magnet type electric rotating machine system including the same machine.

Up to the present time, an induction motor has been employed as the electric rotating machine used for railroad vehicles. In recent years, however, there has been a growing trend to employ a permanent-magnet type electric rotating machine which allows its small-sized and light-weighted implementation and high-efficiency implementation. This growing trend has arisen from low-cost implementation of the permanent magnet and prevalence of the high-performance inverter.

Under the circumstances like this, in order to improve electric characteristics and strength characteristics of the electric rotating machine, consideration is now being given to the permanent-magnet type rotor structure of various forms. In JP-A-9-90517, the following permanent-magnet type rotor structure is disclosed: In a clearance portion within insertion slots for V-character pattern-deployed permanent magnets, there is provided a reinforcement unit for establishing the connection between V-character patterned magnetic-pole parts on the aperture side and V-character patterned yoke parts on the anti-aperture side. The use of this reinforcement unit makes it possible to reduce a leakage magnetic flux leaked into the inside of the rotor, and also to ensure the strength against a centrifugal force applied to the rotor.

SUMMARY OF THE INVENTION

In the case of the railroad-vehicle-targeted motor, its weight exerts a significant influence on the riding comfort feeling of the railroad vehicle. Accordingly, a weight reduction in the electric rotating machine becomes important. The light-weighted implementation of the electric rotating machine increases its output density. Nevertheless, the small-sized implementation in the constitution of the electric rotating machine increases an influence exerted by the magnetic saturation inside the rotating machine. As a result, a current passing through to the stator is increased in order to satisfy the specification output. The increase in the current also increases a magnet eddy current caused by the armature reaction. Moreover, the increase in the magnet eddy current causes the magnet to liberate heat, thereby giving rise to a problem of the demagnetization. This problem requires the execution of a demagnetization countermeasure against the heat liberation due to the magnet eddy current.

In JP-A-9-90517, which relates to the rotor of the V-character pattern-deployed permanent magnets, there is disclosed in its description a magnet diagram where each permanent magnet becomes increasingly narrower toward its rotation axis. In this magnet diagram, however, the edge portion of each permanent magnet forms an acute angle. This acute angle gives rise to a problem of a stress due to the centrifugal force. Also, since no connection portion exists in the center of the V-character pattern, the stress due to the centrifugal force becomes conspicuous similarly.

In the present invention, as the countermeasure against the heat liberation due to the magnet eddy current, the permanent-magnet type electric rotating machine is configured as follows: The deployment of permanent magnets is configured into V-character pattern, the permanent magnets constituting 1 pole inside the rotor iron-core of a rotor. The 1-pole constituting permanent magnets are deployed along a circumferential direction of the rotor iron-core with their polarity changed alternately. Connection portions are provided among the center of the V-character pattern, which becomes the inner-diameter side of the rotor iron-core, the outermost-diameter sides of the permanent magnets, which become right and left edge portions of the V-character pattern, and the outer circumference of the rotor iron-core. Then, the permanent magnets are embedded. The configuration of each permanent magnet is designed as follows: From the thickness of the permanent-magnet edge portion on the inner-diameter side of the rotor iron-core, which becomes the center of the V-character pattern, the thickness of the permanent magnet gradually increases toward the outer-diameter side of the rotor iron-core, which become the right and left edge portions of the V-character pattern. Simultaneously, curved lines are provided on both edge portions of the permanent magnet.

According to the present invention, it becomes possible to prevent the heat demagnetization due to the eddy current, which is induced in a manner of being concentrated onto the edge portions of the permanent magnet on the outer-diameter side of the rotor iron-core.

Other objects, features and advantages of the invention will become apparent from the following description of the embodiments of the invention taken in conjunction with the accompanying drawings.

DESCRIPTION OF THE EMBODIMENTS

Figure 1:
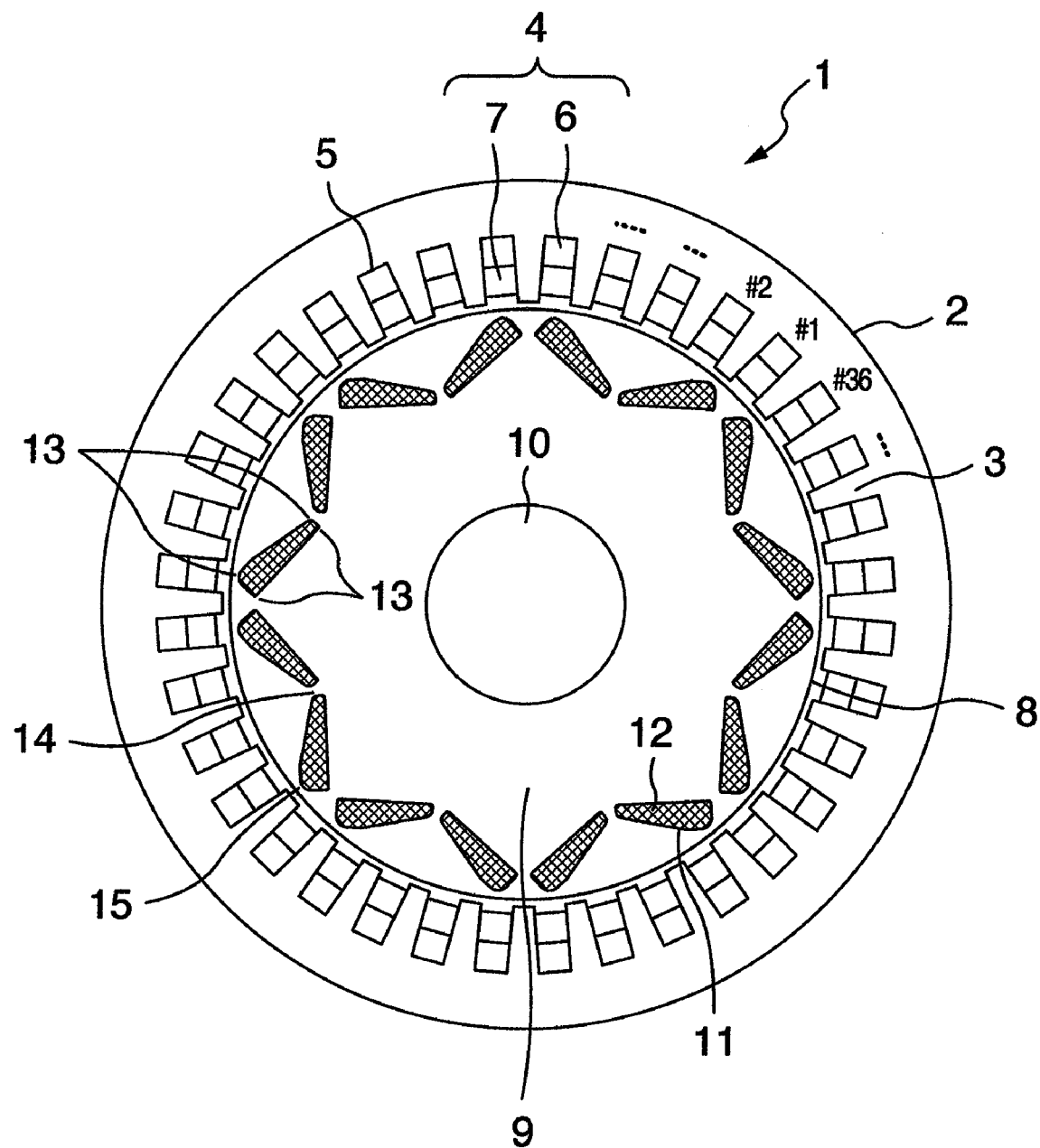
FIG. 1 is an explanatory diagram for explaining a carry-out method for the electric rotating machine (first embodiment)

Hereinafter, referring to the drawings, the explanation will be given below concerning details of the present invention. In

1st Embodiment

FIG. 1 is a cross-sectional diagram of the permanent-magnet type electric rotating machine, which becomes a first embodiment of the present invention. The permanent-magnet type electric rotating machine 1 is an 8-pole & 36-slot electric rotating machine. This 8-pole & 36-slot machine is used for a a-few-hundreds-of-kW-class train, and rotates in a range of 300 to 7000 $\min^{-1}$. A stator 2 is a distribution-winding stator, which includes a cylindrical stator iron-core equipped with a plurality of teeth 3 that protrude from a yoke portion onto its inner-circumference surface, and which also includes a coil 4 formed by winding an elemental wire in a distribution-like manner using the teeth 3. The coil 4 is configured by winding a 3-phase (i.e., U-phase, V-phase, and W-phase) winding so that the 8 poles are electrically implemented with the 36 slots. An upper coil 6 is deployed on the outer-diameter side of each slot 5 formed between the teeth 3, and a lower coil 7 is deployed on the inner-diameter side of each slot 5. The coil 4 is wound in accordance with a scheme referred to as "short-pitch winding", which allows implementation of a reduction in the eddy current loss in comparison with the full-pitch winding. The coil 4 is wire-connected such that, of the numbers ranging from #1 to #36 and affixed to the slots 5 for convenience in a counterclockwise direction, the elemental wire, which has left the lower coil 7 of the #1 slot, enters the upper coil 6 of the #5 slot. This wire-connection constitutes the above-described 3-phase winding which is repeated in the circumferential direction. The number of the #5 slot is the value of 5. This value results from rounding off 4.5 which is obtained by dividing the slot number 36 by the pole number 8. Setting the ratio between the winding pitch and the magnetic-pole pitch (i.e., short-pitch degree) at 5/6 makes it possible to reduce the fifth and seventh space harmonics. Incidentally, in the present embodiment, the combination of the 8 poles and the 36 slots has been employed. It is also allowable, however, to employ a combination of some other pole number and slot number, and further, the combination with the concentration winding or the full-pitch winding.

A rotor 8 is deployed such that the rotor 8 becomes coaxially rotatable with the stator 2. A shaft 10 is fixed onto the axis of a rotor iron-core 9. 1-pole constituting magnet slots 11 are deployed into V-character pattern along an outer circumference portion of the rotor iron-core 9. Permanent magnets 12 are embedded into the 1-pole constituting magnet slots 11. For 1 pole, the 2 pieces of same-polarity permanent magnets 12 are embedded into the V-character pattern, i.e., the 16 pieces of permanent magnets 12 are embedded in total. The configuration of each embedded permanent magnet 12 is designed as follows: From the thickness of the permanent-magnet edge portion on the inner-diameter side of the rotor iron-core 9, which becomes the center of the V-character pattern, the thickness of the permanent magnet gradually increases toward the outer-diameter side of the rotor iron-core 9, which become the right and left edge portions of the V-character pattern. Simultaneously, curved-line portions 13 are provided on both edge portions of the permanent magnet. Also, a connection portion 14 is provided on the inner-diameter side of the rotor iron-core 9, which becomes the center of the V-character pattern. Moreover, a connection portion 15 is provided between the outermost-diameter sides of the permanent magnets inside the rotor iron-core, which become the right and left edge portions of the V-character pattern, and the outer circumference of the rotor iron-core 9. Providing the connection portions 14 and 15 increases the rigidity of the rotor iron-core 9, thereby making it possible to reduce the stress due to the centrifugal force. When a flat-plate permanent magnet is used, a curved-line portion is provided on the magnet slot in order to reduce the concentration stress. Providing the curved-line portion, however, requires the cross-sectional area of the magnet slot which is wider than the cross-sectional area of the flat-plate permanent magnet. Then, just like the present embodiment, by forming the configuration of the magnet slot 11 into a configuration which is geometrically similar to the configuration of the permanent magnet 12, it becomes possible to reduce a clearance between the permanent magnet 12 and the magnet slot 11. This reduction increases an effective magnetic flux supplied from the permanent magnet 12. Also, it becomes possible to limit a movement of the permanent magnet 12 due to the centrifugal force. Also, in order to prevent the phenomena such as rust, flaw, and chipping of the permanent magnet, a surface processing such as coating or plating is applied to the surface of the permanent magnet. At this time, the edge portions of the permanent magnet include acute-angle portions when the flat-plate permanent magnet is used. As a result, a significant dimension error occurs due to phenomena such as slack, accumulation, and a variation in the surface thickness. On account of this significant dimension error, the magnet-slot dimension of the rotor iron-core becomes larger. This largeness increases the clearance portion between the permanent magnet and the magnet slot, thereby worsening the magnetic characteristics. Then, just like the present embodiment, providing the curved-line portions on the edge portions of the magnet results in implementation of the following effects: It becomes easier to acquire a uniform surface-processed thickness, thereby being capable of reducing the dimension error of the permanent magnet. Also, it also becomes possible to reduce the clearance portion between the permanent magnet and the magnet slot, thereby being capable of preventing the worsening in the magnetic characteristics.

Figure 2A:
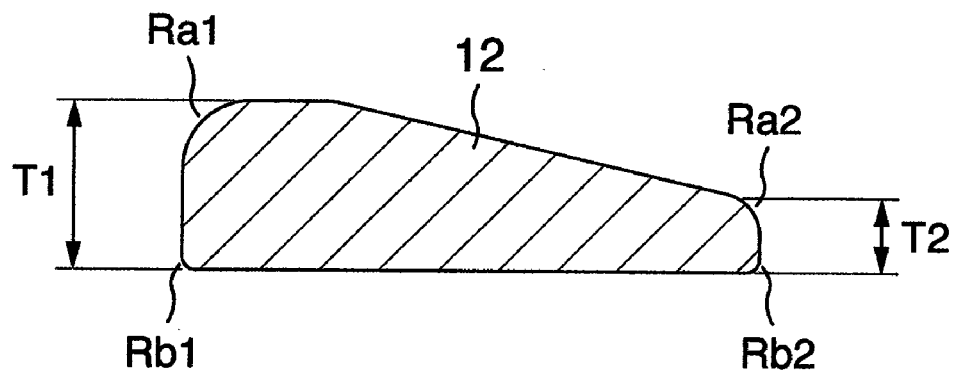
FIGS. 2A and 2B are explanatory diagrams for illustrating the configuration of the permanent magnet (first embodiment)
Figure 2B:
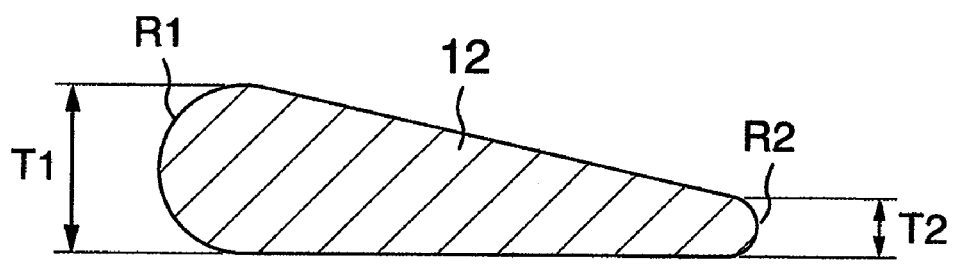

FIGS. 2A and 2B are diagrams for illustrating the configuration of the permanent magnet 12. The permanent-magnet thickness of the permanent magnet 12 is set such that an inequality T1>T2 holds. Here, it is assumed that T1 is the thickness of the permanent-magnet edge portion which is positioned on the outer-diameter side of the rotor iron-core 9 when the permanent magnets 12 are deployed into the V-character pattern, and that T2 is the thickness of the permanent-magnet edge portion which is positioned on the inner-diameter side of the rotor iron-core 9. The location at which the eddy current is induced in a concentrated manner is the permanent-magnet edge portion which is positioned on the outer-diameter side of the rotor iron-core 9. This eddy current causes the permanent magnet to liberate heat, thereby resulting in the demagnetization of the permanent magnet. Thickening the thickness of the permanent-magnet edge portion on the outer-diameter side at which the eddy current is induced in a concentrated manner is outstandingly effective for preventing the demagnetization. Thickening the permanent-magnet thickness increases the Permeance coefficient, thereby making it possible to prevent the demagnetization due to the heat liberation. Moreover, 2 pieces of curved-line portions are provided on the permanent-magnet edge portion on the outer-diameter side of the rotor iron-core 9, which becomes the edge portion of the V-character pattern of the permanent magnets 12. Also, it is assumed that curvature radiuses of the curved-line portions are Ra1 and Rb1 respectively. Furthermore, 2 pieces of curved-line portions are also provided on the permanent-magnet edge portion on the inner-diameter side of the rotor iron-core 9, which becomes the center of the V-character pattern. Also, it is assumed that curvature radiuses of the curved-line portions are Ra2 and Rb2 respectively. At this time, by setting Ra1 into a range of 0<Ra1≦T1, Rb1 into a range of 0<Rb1≦T1, Ra2 into a range of 0<Ra2≦T2, and Rb2 into a range of 0<Rb2≦T2, it becomes possible to relax the concentration stress generated by the centrifugal force (shown in FIG. 2A. In addition, as shown in FIG. 2B, 1 piece of curved-line portion is provided on the permanent-magnet edge portion on the outer-diameter side of the rotor iron-core 9, which becomes the edge portion of the V-character pattern of the permanent magnets 12. Also, 1 piece of curved-line portion is also provided on the permanent-magnet edge portion on the inner-diameter side of the rotor iron-core 9, which becomes the center of the V-character pattern. Also, it is assumed that curvature radiuses of the curved-line portions are R2 and R2 respectively. At this time, by setting R1 into a range of 0<R1≦T1, and R2 into a range of 0<R2≦T2, it also becomes possible to expect a similar effect. Incidentally, in the present drawing, it turns out that Ra1>Rb1, and Ra2>Rb2 are set. Another combination, however, is also allowable as long as Ra1, Rb1, Ra2, and Rb2 fall within the above-described ranges.

In the present embodiment, the condition for T1 and T2 is given as follows: The T1/T2 (T1>T2) ratio is set, and then, a range of 1.5<T1/T2<3.8 is determined and set as the optimum range for the T1/T2 ratio. Hereinafter, referring to FIG. 3, the explanation will be given below concerning this relationship.

Figure 3:
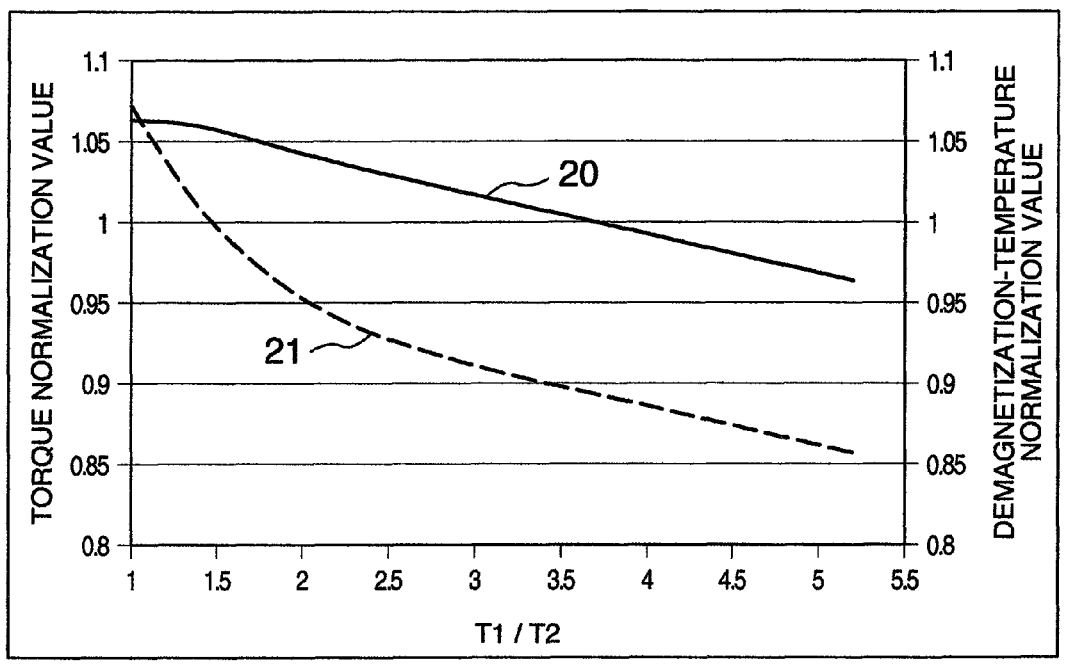
FIG. 3 is an explanatory diagram for explaining the relationship among the permanent-magnet thickness, torque normalization value, and demagnetization-temperature normalization value (first embodiment)

FIG. 3 illustrates the relationship among the T1/T2 ratio, torque normalization value, and demagnetization-temperature normalization value. On the horizontal axis, there is a tendency that, when the value of T1 is increased, the torque is lowered although the upper-limit of the demagnetization temperature is heightened. A line 20 denotes the torque normalization value, where the value at which the specification torque is satisfied is normalized into 1. Also, a line 21 denotes the demagnetization-temperature normalization value, where the temperature at which the demagnetization occurs is normalized into 1. When attention is focused on the torque normalization value, satisfying the target torque requires that the torque normalization value be made larger than 1. Meanwhile, when attention is focused on the demagnetization temperature, satisfying the target demagnetization temperature requires that the demagnetization-temperature normalization value be made smaller than 1. Accordingly, simultaneously satisfying both of the target torque and the target demagnetization temperature requires the following condition: Namely, from the drawing, the torque normalization value is satisfied when the T1/T2 ratio is lower than 3.8, and simultaneously, the demagnetization-temperature normalization value is satisfied when the T1/T2 ratio is higher than 1.5. This simultaneous condition makes it possible to operate the present embodiment as the permanent-magnet type electric rotating machine without any questions. On account of this, it is desirable to set the T1/T2 ratio into the range of 1.5<T1/T2<3.8. Incidentally, when setting T1 and T2, it is desirable to set T1 and T2 such that the resultant area will become equal to the cross-sectional area of the flat-plate permanent magnet at the time when the flat-plate magnet is employed as the criterion (i.e., T1=T2). Setting T1 and T2 in this way makes it possible to acquire the effects without increasing the usage amount of the permanent magnet, thereby allowing implementation of a suppression in the cost.

2nd Embodiment

Figure 4:
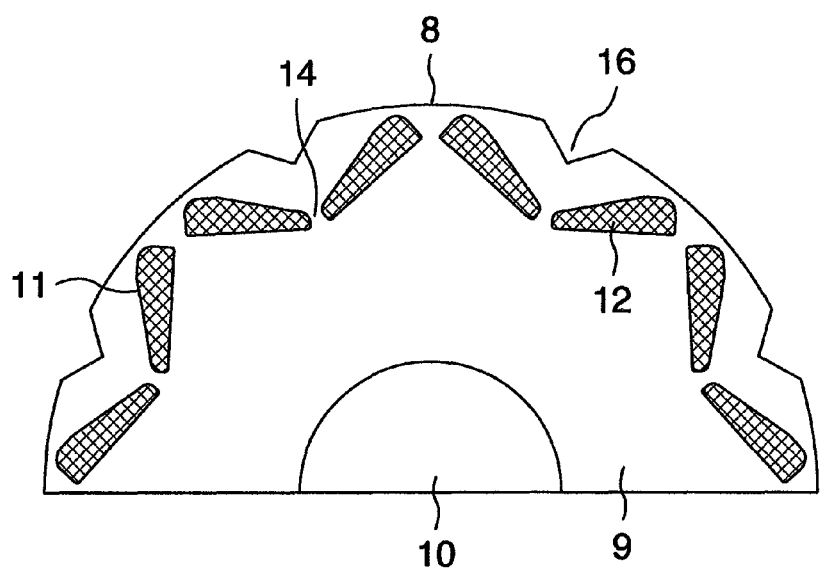
FIG. 4 is an explanatory diagram for explaining a carry-out method for the electric rotating machine (second embodiment)

FIG. 4 is a one-half edge-portion cross-sectional diagram of the rotor, which becomes a second embodiment of the present invention. A concave portion 16 is allowed to be provided in the outer circumference portion of the rotor iron-core 9, which becomes the center of the V-character pattern of the rotor 8, and which has been illustrated in the first embodiment. Providing the concave portion 16 makes it possible to reduce the weight of the iron-core which becomes the central portion of the V-character pattern, thereby allowing a reduction in the concentration stress concentrated onto the connection portion 14 which becomes the inner-diameter side of the rotor iron-core 9 of the V-character pattern's center. Moreover, an air layer is created in the portion in which the concave portion 16 has been provided. This air layer allows implementation of a reduction in the temperature transmitted to the permanent magnet 12. Also, a similar effect can be obtained by providing an empty hole between the connection portion 14 on the inner-diameter side of the rotor iron-core 9 which becomes the center of the V-character pattern, and the outer circumference of the rotor iron-core 9 which becomes the center of the V-character pattern.

3rd Embodiment

Figure 5:
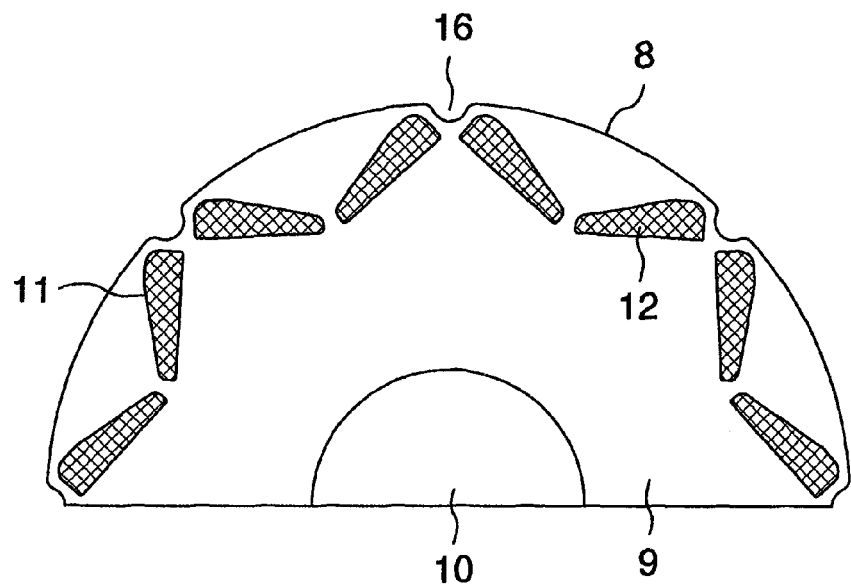
FIG. 5 is an explanatory diagram for explaining a carry-out method for the electric rotating machine (third embodiment)

FIG. 5 is a one-half edge-portion cross-sectional diagram of the rotor, which becomes a third embodiment of the present invention. The concave portion 16 is allowed to be provided in the inter-pole outer circumference in which polarities of the rotor 8 differ from each other, and which has been illustrated in the first and second embodiments. Providing the concave portion 16 creates an air layer. This air layer allows implementation of a reduction in the temperature transmitted to the permanent magnet 12.

4th Embodiment

Figure 6:
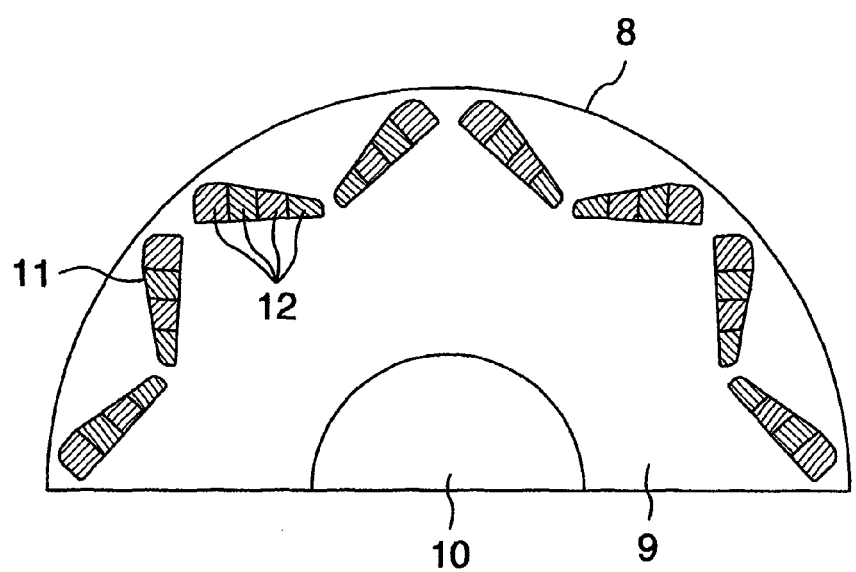
FIG. 6 is an explanatory diagram for explaining a carry-out method for the electric rotating machine (fourth embodiment)
Figure 7:
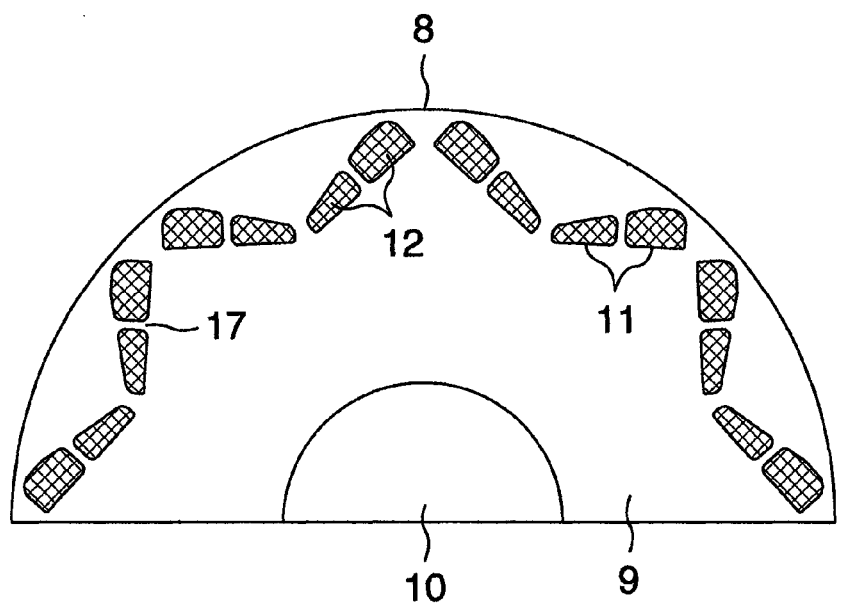
FIG. 7 is an explanatory diagram for explaining the carry-out method for the electric rotating machine (fourth embodiment)

FIG. 6 is a one-half edge-portion cross-sectional diagram of the rotor, which becomes a fourth embodiment of the present invention. Each of the permanent magnets 12, which are deployed into the V-character pattern in the rotor 8, and which have been illustrated in the first, second, and third embodiments, is allowed to be divided in such a manner as to become perpendicular to the inclination angle of the V-character pattern. Dividing the permanent magnet 12 makes it possible to reduce the eddy current. Furthermore, as illustrated in FIG. 7, a connection portion 17 is allowed to be provided between the permanent magnets resulting from this division. Increasing the connection portion 17 heightens the rigidity of the rotor iron-core 9, thereby making it possible to reduce the stress due to the centrifugal force.

5th Embodiment

Figure 8:
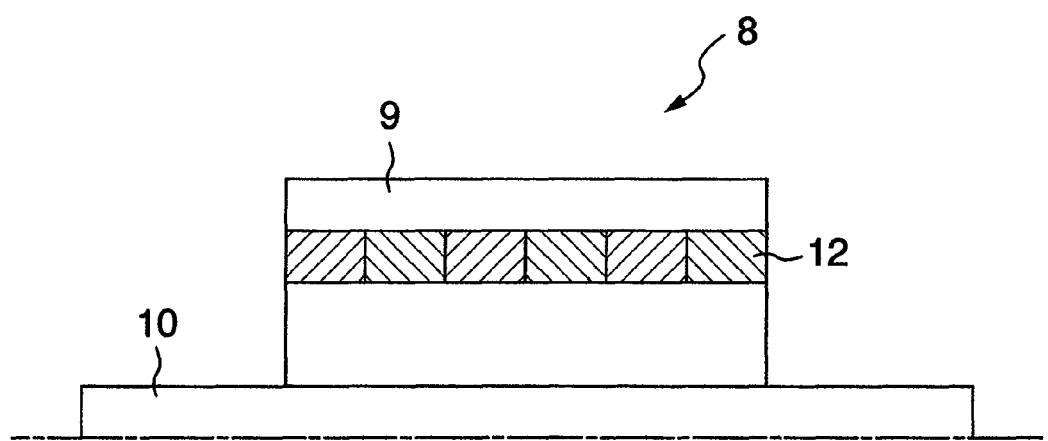
FIG. 8 is an explanatory diagram for explaining a carry-out method for the electric rotating machine (fifth embodiment)

FIG. 8 is an axis-direction cross-sectional diagram of the rotor, which becomes a fifth embodiment of the present invention. Each of the permanent magnets 12, which have been illustrated in the first, second, and third embodiments, is allowed to be divided in the axis direction. Dividing the permanent magnet 12 in the axis direction and embedding the magnets resulting from this division makes it possible to enhance the assembly property of the rotor 8.

6th Embodiment

Figure 9:
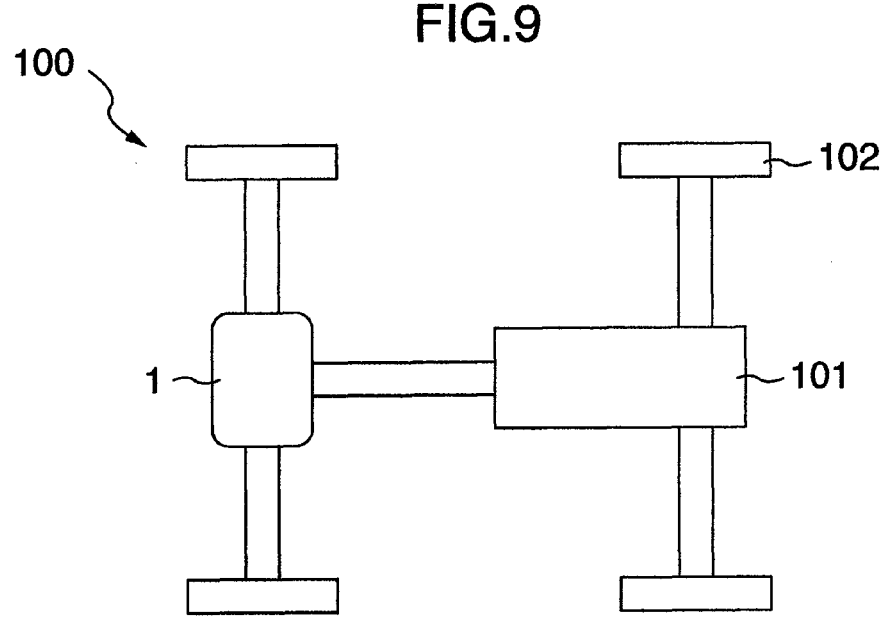
FIG. 9 is an explanatory diagram for explaining a carry-out method for the electric rotating machine (sixth embodiment)

FIG. 9 illustrates an embodiment where the electric rotating machine of the present invention is applied to an automobile. The automobile 100 includes the permanent-magnet type electric rotating machine 1 illustrated in the first to the fourth embodiments, an acceleration gear 101, and wheels 102. The permanent-magnet type electric rotating machine 1 drives the wheels 102 via the acceleration gear 101. Also, although only one permanent-magnet type electric rotating machine 1 is illustrated in the drawing, a plurality of electric rotating machines can be installed to be used for the driving.

7th Embodiment

Figure 10:
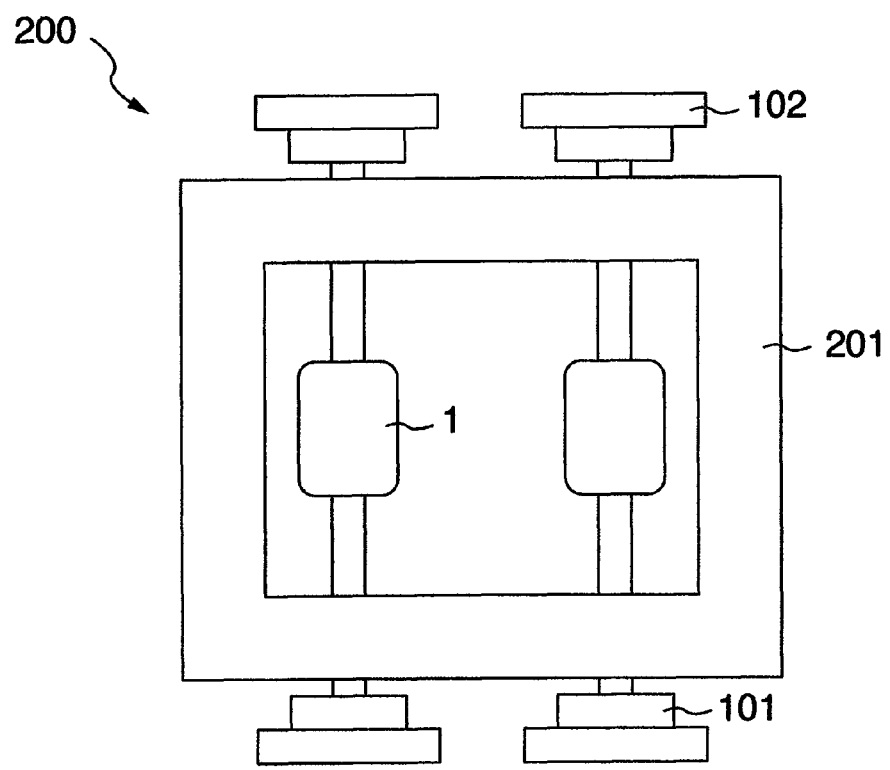
FIG. 10 is an explanatory diagram for explaining a carry-out method for the electric rotating machine (seventh embodiment).

FIG. 10 illustrates an embodiment where the electric rotating machine of the present invention is applied to a train. The train 200 includes the permanent-magnet type electric rotating machine 1 illustrated in the first to the fourth embodiments, an acceleration gear 101, and wheels 102. The permanent-magnet type electric rotating machine 1 drives the wheels 102 via the acceleration gear 101. Also, although two permanent-magnet type electric rotating machines 1 are illustrated in the drawing, one electric rotating machine, or a plurality of, i.e., two or more electric rotating machines can be installed to be used for the driving.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A permanent-magnet type electric rotating machine, wherein:
   permanent magnets are provided in a rotor iron-core of a permanent-magnet rotor, one pole being configured by deploying said permanent magnets into a V-character pattern, said one pole being deployed along a circumferential direction with its polarity changed alternately;
   a thickness of each of said permanent magnets gradually increases from a central portion of said V-character pattern of an inner-diameter side of said rotor toward right and left edge portions of said V-character pattern of an outer-diameter side of said rotor; and
   a curved line is provided on said edge portions of said V-character pattern of an outer-diameter side of said rotor.

2. A permanent-magnet type electric rotating machine, wherein:
   permanent magnets are provided in a rotor iron-core of a permanent-magnet rotor, one pole being configured by deploying said permanent magnets into V-character pattern, said one pole being deployed along a circumferential direction with its polarity changed alternately;
   a connection portion is provided between said permanent magnets which are deployed on inner-diameter side of said rotor iron-core, and which constitute central portion of said V-character pattern;
   a connection portion is provided between said permanent magnet and outer circumference of said rotor iron-core, said permanent magnet being deployed on outer-diameter side of said rotor iron-core, and constituting an edge portion of said V-character pattern ;
   said connection portions are used for establishing connection between said outer-diameter side of said rotor iron-core and said inner-diameter side thereof;
   a relationship T1>T2 is specified between T1 and T2, wherein T1 is thickness of said permanent magnet which is positioned on said outer-diameter side of said rotor iron-core, and which becomes said edge portion of said V-character pattern, and T2 is thickness of said permanent magnet which is positioned on said inner-diameter side of said rotor iron-core, and which becomes said central portion of said V-character pattern.

3. The permanent-magnet type electric rotating machine according to claim 2, wherein:
   a curved-line portion is provided on said edge portion of said permanent magnet which is positioned on said outer-diameter side of said rotor, and which becomes said edge portion of said V-character pattern;
   a curved-line portion is also provided on said edge portion of said permanent magnet which is positioned on said inner-diameter side of said rotor, and which becomes said central portion of said V-character pattern; and
   when determining that curvature radiuses of said curved-line portions are R1 and R2 respectively, relationships $0<R1 \leq T1$ and $0<R2 \leq T2$ are specified between said R1 and said T1 and between said R2 and said T2.

4. The permanent-magnet type electric rotating machine according to claim 2, wherein
   configuration of a permanent-magnet insertion aperture of said rotor iron-core is formed into a configuration which is geometrically similar to configuration of said permanent magnet.

5. The permanent-magnet type electric rotating machine according to claim 2, further comprising a stator including a plurality of teeth which protrude onto inner-circumference surface of a yoke portion, wherein
   a coil is wound around said teeth in accordance with concentration winding or distribution winding.

6. The permanent-magnet type electric rotating machine according to claim 2, wherein
   a concave portion is provided in said outer circumference portion of said rotor iron-core in said central portion of said V-character pattern.

7. The permanent-magnet type electric rotating machine according to claim 2, wherein
   a concave portion is provided in said outer circumference portion of said rotor iron-core between poles of said rotor whose polarities differ from each other.

8. The permanent-magnet type electric rotating machine according to claim 2, wherein
   each of said permanent magnets is divided in such a manner as to become perpendicular to inclination angle of said V-character pattern.

9. The permanent-magnet type electric rotating machine according to claim 2, wherein
   an empty hole is provided between said connection portion and said outer circumference of said rotor iron-core in said center of said V-character pattern, said connection portion being positioned on said inner-diameter side of said rotor iron-core, and becoming said center of said V-character pattern of said rotor.

10. The permanent-magnet type electric rotating machine according to claim 2, wherein
    each of said permanent magnets is divided in its axis direction.

11. A permanent-magnet type electric rotating machine system for automobile, wherein
    said permanent-magnet type electric rotating machine described in claim 2 is employed as its power source.

12. A permanent-magnet type electric rotating machine system for train, wherein
    said permanent-magnet type electric rotating machine described in claim 2 is employed as its power source.

* * * * *